US011099966B2

(12) United States Patent
Klein et al.

(10) Patent No.: US 11,099,966 B2
(45) Date of Patent: Aug. 24, 2021

(54) EFFICIENT GENERATION OF INSTRUMENTATION DATA FOR DIRECT MEMORY ACCESS OPERATIONS

(71) Applicant: INTERNATIONAL BUSINESS MACHINES CORPORATION, Armonk, NY (US)

(72) Inventors: Matthias Klein, Poughkeepsie, NY (US); Deanna P. D. Berger, Hyde Park, NY (US); Craig R. Walters, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/738,311

(22) Filed: Jan. 9, 2020

(65) Prior Publication Data

US 2021/0216430 A1    Jul. 15, 2021

(51) Int. Cl.
*G06F 11/34* (2006.01)
*G06F 11/30* (2006.01)
*G06F 13/28* (2006.01)

(52) U.S. Cl.
CPC ........ *G06F 11/349* (2013.01); *G06F 11/3037* (2013.01); *G06F 13/28* (2013.01); *G06F 2213/28* (2013.01)

(58) Field of Classification Search
CPC ............. G06F 11/3037; G06F 11/3041; G06F 11/3485; G06F 11/349; G06F 12/0835; G06F 12/1081; G06F 13/161; G06F 13/28; G06F 15/17331; G06F 2213/28; G06F 2213/2802
See application file for complete search history.

(56) References Cited

U.S. PATENT DOCUMENTS

| 6,412,028 B1 | 6/2002 | Steed et al. |
| 6,526,370 B1* | 2/2003 | Yu ........................ G06F 11/3409 702/176 |
| 7,620,748 B1* | 11/2009 | Bruce ..................... G06F 13/28 710/22 |
| 7,694,035 B2* | 4/2010 | Chen ...................... G06F 13/28 710/22 |
| 7,995,587 B2* | 8/2011 | Komoriya ........ H04N 21/23608 370/395.64 |

(Continued)

OTHER PUBLICATIONS

Harvey et al., "DMA Fundamentals on Various PC Platforms," National Instruments Corporation, 1994. 19p.
(Continued)

*Primary Examiner* — Thomas J. Cleary
(74) *Attorney, Agent, or Firm* — Cantor Colburn LLP; Margaret McNamara

(57) ABSTRACT

Aspects of the invention include efficient generation of instrumentation data for direct memory access operations. A non-limiting example apparatus includes an instrumentation component, residing in a cache in communication with a plurality of processing units, an accelerator, and a plurality of input output interfaces. The cache includes a direct memory access monitor that receives events from the accelerator its respective I/O interface and stores DMA state and latency for each event. The cache also includes a bucket including a DMA counter and a latency counter in communication with the DMA monitor, wherein the bucket stores in the DMA counter a count of DMAs coming from a source and stores in the latency counter the latency measured for each DMA coming from the source.

17 Claims, 4 Drawing Sheets

(56) References Cited

U.S. PATENT DOCUMENTS

| | | | |
|---|---|---|---|
| 9,170,912 B1 | 10/2015 | Hu et al. | |
| 9,715,464 B2* | 7/2017 | McBride | G06F 13/4068 |
| 9,971,713 B2 | 5/2018 | Asaad et al. | |
| 10,120,820 B2* | 11/2018 | Chen | G06F 13/18 |
| 2005/0193256 A1* | 9/2005 | Moyer | G06F 11/3485 |
| | | | 714/30 |
| 2008/0126612 A1* | 5/2008 | Barrow | G06F 13/28 |
| | | | 710/34 |
| 2013/0159449 A1* | 6/2013 | Taylor | G06F 9/544 |
| | | | 709/212 |
| 2015/0032914 A1* | 1/2015 | Brewerton | G06F 13/28 |
| | | | 710/25 |
| 2017/0177241 A1* | 6/2017 | Erickson | G06F 3/0653 |
| 2019/0278485 A1* | 9/2019 | Benisty | G06F 13/4295 |
| 2019/0372866 A1* | 12/2019 | Ganguli | H04L 49/9047 |

OTHER PUBLICATIONS

IPCOM000127437D. "A Method for Direct Memory Access (DMA)," IP.com. Aug. 30, 2005. 6p.

IPCOM000225775D. "Method for Implementing Direct Memory Access (DMA) Commands for Common Mutual-Exclusion (Mutex) Operations, " IP.com, Mar. 5, 2013. 4p.

IPCOM000226922D. "Affinitation of Private Receive Memory Clusters in a Virtual Machine Computing Enviroment, " IP.com, Apr. 24, 2013. 3p.

Pandey et al., "DMA-Aware Memory Energy Management, "America Physical Society, Department of Computer Science, University of Illinois at Urbana Champaign, Rutgers University, 2006. 12p.

* cited by examiner

EFFICIENT GENERATION OF INSTRUMENTATION DATA FOR DIRECT MEMORY ACCESS OPERATIONS

BACKGROUND

The present invention generally relates to instrumentation and more specifically, to efficient generation of instrumentation data for direct memory access operations.

Traditionally, there has been little support for instrumentation facilities for direct memory access ("DMA") devices, for example input/output ("I/O") information. Information has typically been inferred using core instrumentation data along with abstract instrumentation data from I/O and design insights. While already being an issue in traditional I/O workloads that are comparably insensitive to latencies, DMA based accelerators require the ability to get additional insights due to their immediate impact on user observable performance.

SUMMARY

Embodiments of the present invention are directed to efficient generation of instrumentation data for direct memory access operations. A non-limiting example apparatus includes a cache in communication with a plurality of processing units, an accelerator attached to the cache, and a plurality of input output ("I/O") interfaces. The cache includes a direct memory access ("DMA") monitor that receives events from the accelerator and its respective I/O interface and stores DMA state and latency for each event. The DMA monitor also includes buckets containing a DMA counter and a latency counter in communication with the cache, wherein the bucket stores in the DMA counter a count of DMAs coming from a source and stores in the latency counter the latency measured for each DMA coming from the source.

Other embodiments of the present invention include a method of monitoring DMA. The method includes receiving a DMA from a source and incrementing a DMA counter for the source. The method records a latency for the source and updates a bucket identified by the source and a hit state with the DMA counter and the latency.

Other embodiments of the present invention include a cache containing an instrumentation component in communication with a plurality of processing units, an accelerator, and a plurality of input output ("I/O") interfaces. The cache includes a direct memory access ("DMA") monitor that receives events from the accelerator and its respective I/O interface and stores DMA state and latency for each event. The DMA monitor also includes buckets including a DMA counter and a latency counter in communication with the cache, wherein the bucket stores in the DMA counter a count of DMAs coming from a source and stores in the latency counter the latency measured for each DMA coming from the source. The cache also includes a total DMA fetch counter, a total DMA store counter, and a resource unavailability counter each in communication with the DMA monitor.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
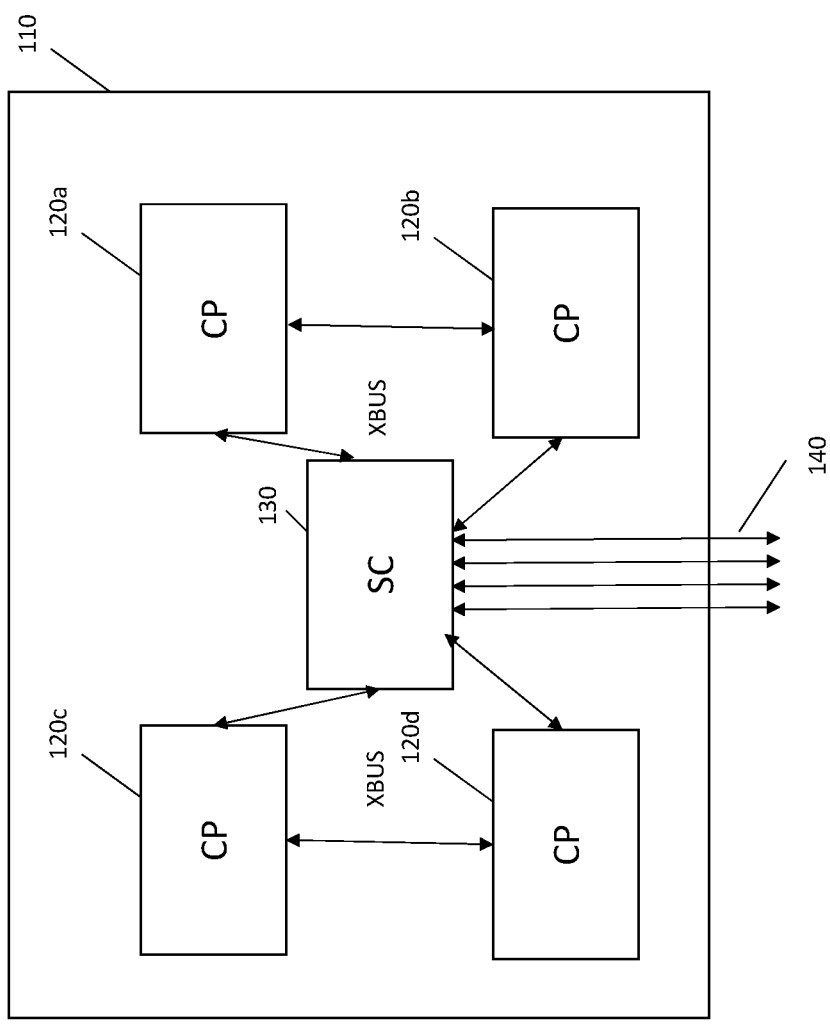
FIG. 1 illustrates a drawer in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

One or more embodiments of the present invention provides processor instrumentation facilities available in processor cores to a component dedicated to direct memory access ("DMA") integrated into a third level cache.

Processor cores, or "cores," have very sophisticated and expensive instrumentation facilities. These facilities track a number of latencies for fetches depending on their source. Contemporary nest and memory subsystems do not track or provide any information about DMA latencies and access patterns. Only anecdotal instrumentation sampling currently exists within an input output ("I/O") client, with only a small amount of accesses being tracked and no information about data source or target readily available. Latencies in memory subsystems have been an ongoing issue for I/O and coupling workloads.

Cores have very sophisticated (and expensive) instrumentation facilities. These facilities track number and latencies for fetches depending on their source, track every fetch issued by the core, provide exact understanding of how long core accesses are taking, and insights into reasons for access time. Nest and memory subsystems do not track or provide any information about DMA latencies and access patterns. Components utilizing DMA have latency counters that track information on an incidental basis. The latency counters track cycles of delay. But, only a small amount of accesses is tracked and no information in relation to data source is available Latencies in the memory subsystem have been an ongoing secondary issue for I/O workloads. Typical debug requires design insights, special setup and checkstop dump analysis. With new accelerators DMA latencies become crucial. Users are very aware of cycles spent doing acceleration. If the number of cycles goes up due to elongated DMA latencies, there is a need for insights into both the latency and the data sources One or more embodiments of the present invention address one or more of the above-described shortcomings of the prior art by providing a new hardware component, referred to herein as a DMA instrumentation component, that monitors pipe activity in level three cache ("L3"). The new component identifies DMA and tracks a number of them per client at a time, incrementing a latency counter for each tracked DMA. It does this by piggybacking onto the L3 pipe to identify a type and requestor. For each tracked DMA, the new hardware component reconstructs the flow and the expected number of responses depending on events (fetches, stores, partials, and broadcasts).

The component identifies the data source based on a handling controller and an available data source field. Depending on the hit state and source ("a bucket"), the component increments counters when the DMA completes, providing a total latency count and a number-of-events counter. Additional counters provide further insights. The additional counters monitor resource availability keeping DMA's from going to the pipe and monitor non-tracked direct memory accesses for statistical purposes.

One or more embodiments of the present invention provide technological improvements over current methods of DMA instrumentation that provide little to no insight into DMA based on e.g. hit state. One or more embodiments of the present invention provide technical solutions to one or more of these disadvantages of existing solutions by providing the ability to freeze, reset, and checkstop various conditions including exceeding latency thresholds and certain hit cases.

Embodiments of the invention also provide the ability to track latencies per hit state for DMA fetches, stores, atomics, and broadcasts. Embodiment of the present invention provide the ability to account for dead cycles introduced by general back pressure, as well as the ability to checkstop depending on commands from certain sources reaching thresholds in a certain hit state for generating debug information. Embodiment of the present invention also provide insights into performance inhibitors for DMA-based accelerator workloads and into workload distribution for I/O.

Turning now to FIG. 1, a drawer 110 is generally shown in accordance with one or more embodiments of the present invention. A typical system may contain, for example, five drawers 110, with each drawer communication with each other drawer over a bus interconnect 140. Each drawer 110 contains a plurality of central processors ("CP") 120*a-d*. Each CP 120 communicates to a system controller ("SC") 130 over a bus.

Figure 2:
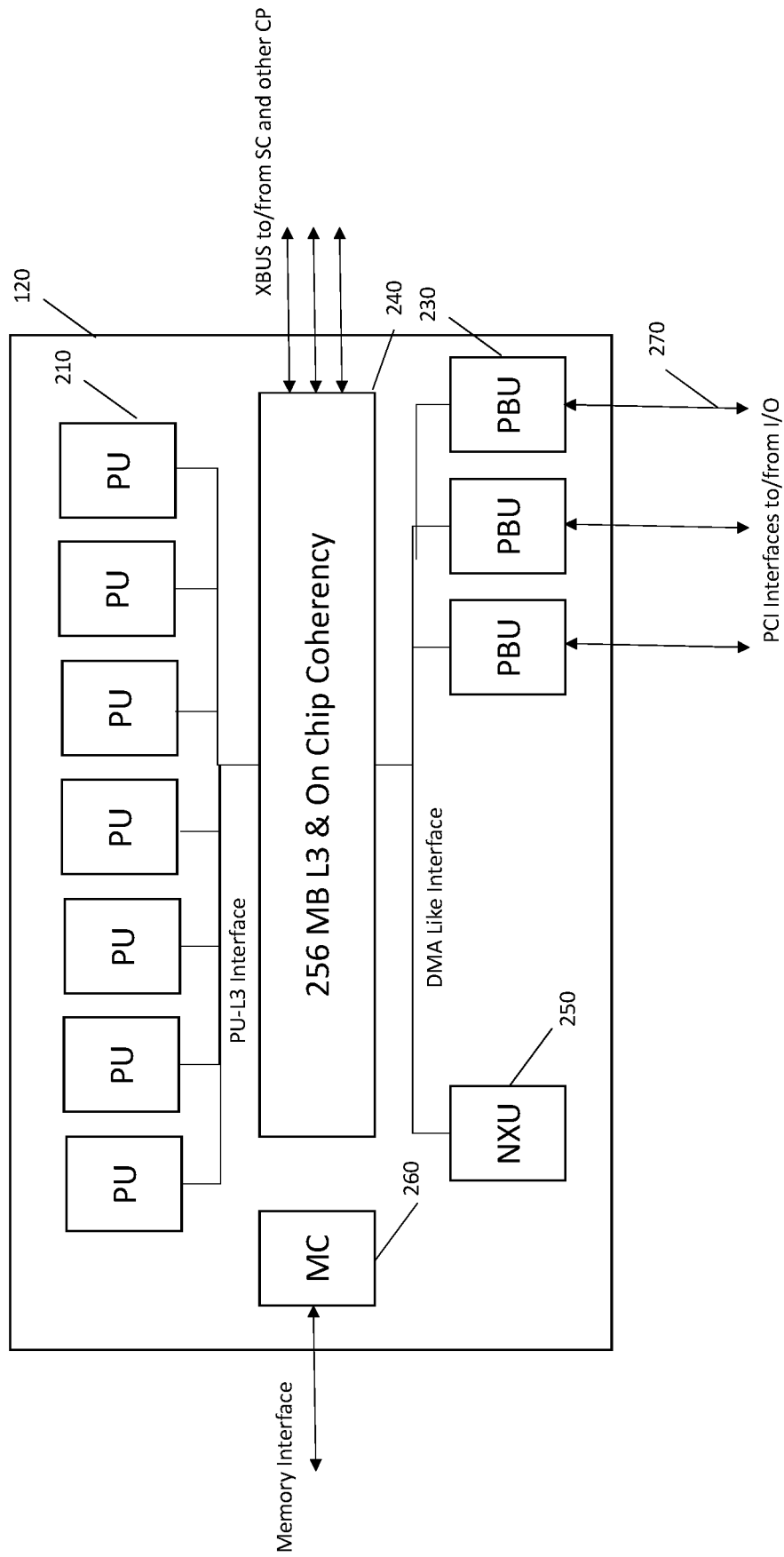
FIG. 2 illustrates a central processor in accordance with one or more embodiments of the present invention.

FIG. 2 illustrates a central processor 120 in accordance with one or more embodiments of the present invention. The CP 120 includes a plurality of processing units ("PUs") 120 that communicate over a PU L3 interface with a L3 cache 240. The DMA instrumentation component resides on the L3 cache 240, so that it can observe and record traffic. The L3 cache 240 communicates over the XBUS to the SC 130 and other CP's (shown in FIG. 1). A plurality of PCIe Bridge Units PBU's 230 communicate via PCI interfaces 270 ("I/O interfaces") to and from I/O. An accelerator 250 that uses DMA for its data transfers communicates over a DMA-like interface to the PBU's 230 and the L3 cache 240. A memory controller 260 servers as the memory interface.

Figure 3:
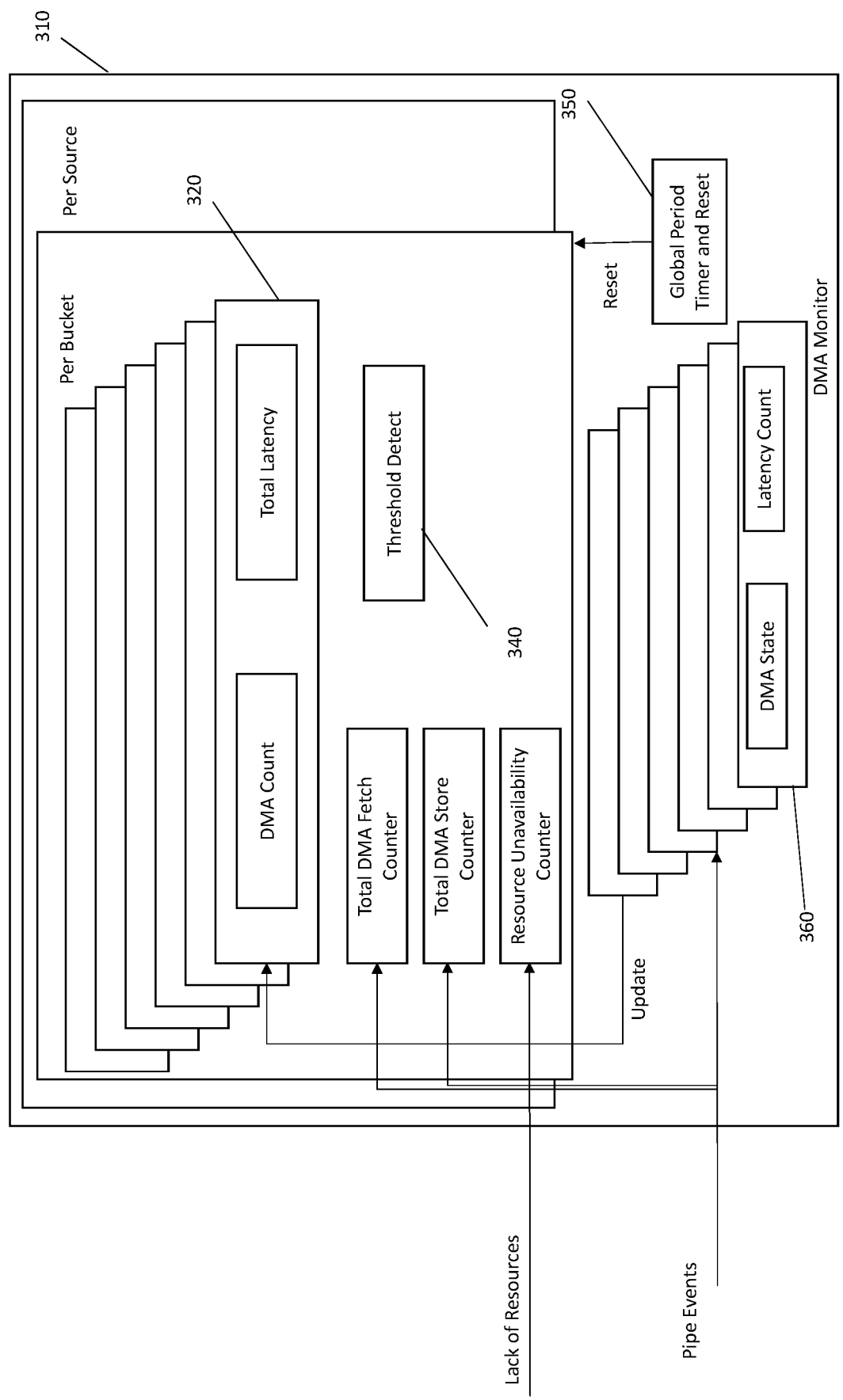
FIG. 3 illustrates a DMA instrumentation component in accordance with one or more embodiments of the present invention.

FIG. 3 illustrates a DMA instrumentation component 310 in accordance with one or more embodiments of the present invention. The DMA instrumentation component 310 includes, for each bucket 320, a DMA counter and total latency counter. A source is either an accelerator, such as NXU 250 or an I/O. Buckets represent a type and a hit state. For example, a type and hit state cat be a DMA store type in local L3 or a DMA fetch type in a remote drawer memory. The DMA counter and total latency counter record what ratio of commands hit at what locations and measures the latency per hit state. In one exemplary embodiment, there are eight buckets 320.

The DMA instrumentation component 310 also includes a total DMA fetch counter, a total DMA store counter, and a resource unavailability counter which tracks when resources are not available. A DMA monitor 360 monitors individual DMA state and latency count based on activity that is reported by type, for example, a new DMA arriving from a source, a DMA finishing, or a DMA identifying by a hit state.

A threshold detector 340 may trigger events based on the counters identified in the previous paragraph. For example, checkers and checkstops may be triggered. A Global period timer and reset 350 sets maximum values of the various counters and allows software or firmware control to start and stop measurements.

Through this hardware, the DMA instrumentation component also counts all DMA it does not track, giving insights into a total amount of traffic. It uses a pipe requestor ID to correlate pipe activity with the tracked DMA. The DMA instrumentation component also uses pipe mode to identify the latency observed by the DMA source depending on hit state and command type. For fetches, the pipe provides a mapped response source for DMA for misses and a Merge Controller handling the fetch indicates a local cache hit. For stores, a Store Controller handling the store indicates a chip miss while a Merge Controller handling the store indicates a chip hit.

The DMA instrumentation component can reset counts as a code action or driven by events, for example, maximum period length expired. It can freeze counts as a code action or driven by events, such as any latency counter saturating, total number of commands saturating, or any fence seen. It can trap, or checkstop, on certain events, such as counters reaching thresholds.

Figure 4:
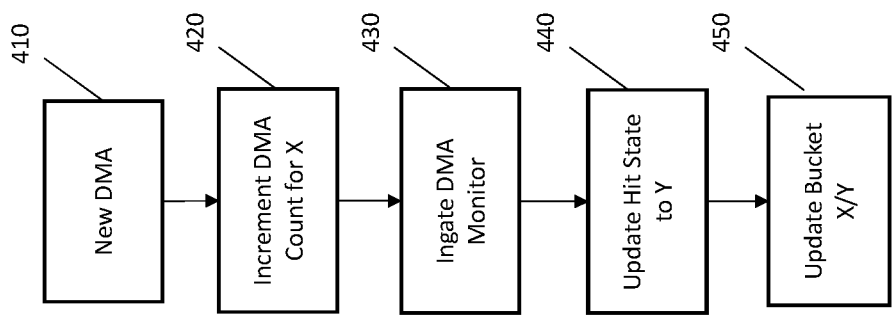
FIG. 4 illustrates a flowchart of operation of the instrumentation component 110 in accordance with one or more embodiments of the present invention.

FIG. 4 illustrates a flowchart of operation of the instrumentation component 110 in accordance with one or more embodiments of the present invention. Upon the arrival of a new DMA (block 410), the DMA counter for the DMA, such as DMA X, is incremented (block 420). The DMA monitor 360 is also ingated (block 430), and the hit state is identified and updated to Y (block 430). Bucket X/Y is then updated (block 450). A bucket is identified based on source X and hit state Y. This bucket's DMA count is incremented, and the latency measured by the DMA monitor 360 is stored as the total latency for this bucket. The DMA Monitor 360 is then released.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system comprising:
   a central processor comprising:
      a level three (L3) cache in communication with a plurality of processing units;
      an accelerator; and
      a plurality of input output (I/O) interfaces,
   wherein the L3 cache comprises a direct memory access (DMA) monitor that receives events from the accelerator and the plurality of I/O interfaces and stores DMA state and latency for each event, and
   the DMA monitor comprises a bucket that includes a DMA counter and a latency counter, wherein the bucket stores in the DMA counter a count of DMAs coming from a source and stores in the latency counter the latency measured for each DMA coming from the source.

2. The system of claim 1, further comprising a total DMA fetch counter in communication with the DMA monitor.

3. The system of claim 1, further comprising a total DMA store counter in communication with the DMA monitor.

4. The system of claim 1, further comprising a resource unavailability counter in communication with the DMA monitor.

5. The system of claim 1, further comprising a threshold detector.

6. The system of claim 5, wherein the threshold detector triggers events based on a total DMA fetch counter.

7. The system of claim 5, wherein the threshold detector triggers events based on a total DMA store counter.

8. The system of claim 5, wherein the threshold detector triggers events based on a resource unavailability counter.

9. The system of claim 1, further comprising a global period timer.

10. The system of claim 1, wherein the bucket represents a type of a DMA.

11. The system of claim 1, wherein events are generated by the accelerator.

12. The system of claim 1, wherein events are generated by one of the plurality of I/O interfaces.

13. A method of monitoring direct memory access (DMA), comprising:
receiving, at a direct memory access monitor (DMA) monitor in a level three (L3) cache, events from an accelerator and a plurality of input/output (I/O) interfaces, the L3 cache in communication with and located on the same central processor as an accelerator and the I/O interfaces; and
storing a DMA state and latency for each event,
wherein the DMA monitor comprises a bucket including a DMA counter and a latency counter and the bucket stores in the DMA counter a count of DMAs coming from a source and stores in the latency counter the latency measured for each DMA coming from the source, the source one of an I/O interface of the plurality of I/O interfaces and the accelerator.

14. The method of claim 13, further comprising updating a hit state with a hit state of the DMA.

15. The method of claim 13, further comprising monitoring resource availability.

16. The method of claim 13, further comprising monitoring non-tracked DMA to provide statistics on the non-tracked DMA.

17. The method of claim 13, further comprising checkstopping when a latency threshold is exceeded.

* * * * *